(12) United States Patent
Zhang et al.

(10) Patent No.: US 9,216,492 B2
(45) Date of Patent: Dec. 22, 2015

(54) FUNCTIONALIZATION OF CUBIC BORON NITRIDE AND METHOD OF MAKING THE SAME

(71) Applicant: DIAMOND INNOVATIONS, INC., Worthington, OH (US)

(72) Inventors: Kai Zhang, Westerville, OH (US); Christopher Allen Long, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 98 days.

(21) Appl. No.: 13/951,611

(22) Filed: Jul. 26, 2013

(65) Prior Publication Data

US 2014/0157681 A1    Jun. 12, 2014

Related U.S. Application Data

(60) Provisional application No. 61/678,063, filed on Jul. 31, 2012.

(51) Int. Cl.
| | |
|---|---|
| B24D 3/00 | (2006.01) |
| B24D 3/02 | (2006.01) |
| B24D 11/00 | (2006.01) |
| B24D 18/00 | (2006.01) |
| C09K 3/14 | (2006.01) |
| B24D 3/06 | (2006.01) |
| B01J 3/06 | (2006.01) |
| B24D 5/00 | (2006.01) |

(52) U.S. Cl.
CPC . *B24D 3/06* (2013.01); *B01J 3/062* (2013.01); *B24D 5/00* (2013.01); *B24D 18/0009* (2013.01); *B01J 2203/062* (2013.01); *B01J 2203/063* (2013.01); *B01J 2203/066* (2013.01); *B01J 2203/068* (2013.01); *B01J 2203/0635* (2013.01); *B01J 2203/0645* (2013.01); *B01J 2203/0655* (2013.01)

(58) Field of Classification Search
USPC ............................................ 51/308, 293, 307
See application file for complete search history.

(56) References Cited

U.S. PATENT DOCUMENTS

| | | | | |
|---|---|---|---|---|
| 3,918,219 | A * | 11/1975 | Wentorf et al. | 51/307 |
| 4,016,244 | A * | 4/1977 | Susa et al. | 423/290 |
| 4,551,316 | A * | 11/1985 | Iizuka | 423/290 |
| 5,000,760 | A * | 3/1991 | Ohtsubo et al. | 51/293 |
| 5,104,420 | A * | 4/1992 | Yoshida et al. | 51/293 |
| 2010/0064594 | A1* | 3/2010 | Pakalapati et al. | 51/308 |

FOREIGN PATENT DOCUMENTS

| | | |
|---|---|---|
| DE | 19854487 A1 | 5/1999 |
| EP | 0022177 B1 | 1/1985 |
| EP | 1237647 B1 | 2/2004 |
| GB | 1240526 A | 7/1971 |
| WO | 2010020962 A2 | 2/2010 |

* cited by examiner

*Primary Examiner* — James McDonough
(74) *Attorney, Agent, or Firm* — Keith DeMaggio

(57) ABSTRACT

A superabrasive material and method of making the superabrasive material are provided. The superabrasive material may comprise a superabrasive crystal and a plurality of particles. The plurality of particles may be included within the superabrasive crystal. The plurality of particles may comprise a non-catalyst material.

21 Claims, 5 Drawing Sheets

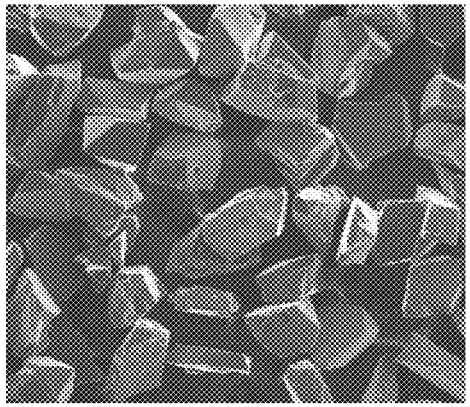
FIG. 6A TB8 120/140
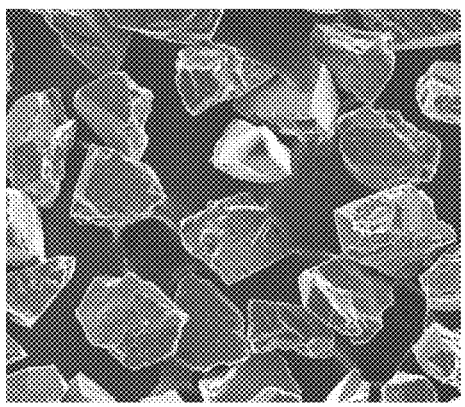
FIG. 6C 90μm sieve
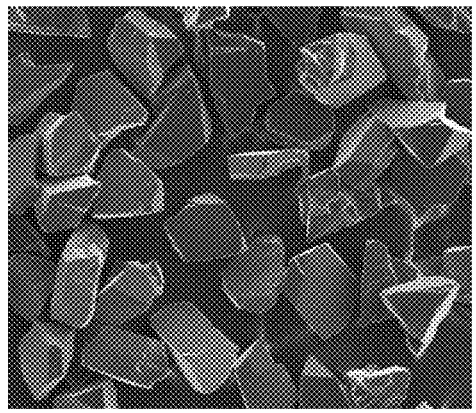
FIG. 6B commercial CBN 120/140
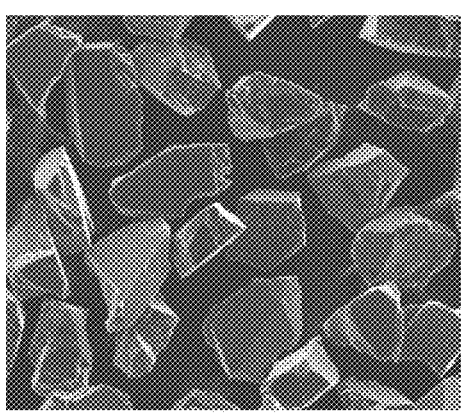
FIG. 6D 90μm sieve

FUNCTIONALIZATION OF CUBIC BORON NITRIDE AND METHOD OF MAKING THE SAME

CROSS-REFERENCE TO RELATED APPLICATIONS

This application claims priority of provisional application, No. 61/678,063, filed Jul. 31, 2012.

TECHNICAL FIELD AND INDUSTRIAL APPLICABILITY

The present disclosure relates to hard abrasive particles and its method of manufacturing them, more specifically, to the growth of diamond nuclei or cubic boron nitride crystals.

Vitreous bond (vit-bond) grinding wheels made with cubic boron nitride (CBN) superabrasive materials are commonly used for grinding applications. Due to the nature of the CBN having hardness next to diamond, the grinding wheel made with CBN possesses low wheel wear, high grinding ratio and good surface finish. However, work piece may be burned if it is ground at accelerated grinding condition.

Therefore, it can be seen that there is a need for a grinding tool made from superhard composite material to be used in toughness demanding operation, such as accelerate grinding condition.

SUMMARY

In one embodiment, a superabrasive material may comprise a superabrasive crystal; and a plurality of particles included within the superabrasive crystal, wherein the plurality of particles comprises a non-catalyst material.

In another embodiment, a method may comprise steps of providing a plurality of hexagonal boron nitride (hBN) grains; providing a catalyst and a plurality of particles as non-binder material; and subjecting the plurality of hBN grains, the catalyst, and non-binder material to a high pressure and high temperature for a time period sufficient to form a single crystal structure.

In yet another embodiment, a superabrasive material made of cubic boron nitride (cBN) may comprise a single crystal structure of cubic boron nitride; and means for modifying a crystal fracture path of the cubic boron nitride.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

FIG. 6A is a scanning electron micrograph (SEM) image of TB8 of mesh 120/140 prior to crushing;

FIG. 6B is a scanning electron micrograph (SEM) image of commercial cBN of 120/140 prior to crushing;

FIG. 6C is a scanning electron micrograph (SEM) image of TB8 collected on top 90 μm sieve after crushing; and FIG. 6D is a scanning electron micrograph (SEM) image of commercial cBN collected on top 90 μm sieve after crushing.

DETAILED DESCRIPTION

Figure 1:
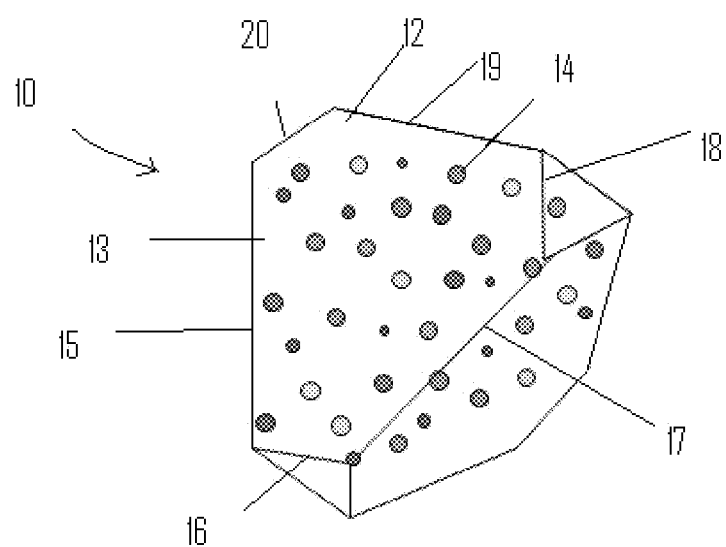
FIG. 1 is a schematic view of a superabrasive material with a plurality of particles inclusion according to an exemplary embodiment.

An exemplary embodiment may provide an abrasive grain with a unique structure. The unique structure may possess low grinding power consumption while maintaining a competitive grinding ratio during vitreous-bond steel grinding.

An exemplary embodiment may provide an abrasive grain, such as a cubic boron nitride (cBN) or a diamond (superabrasive) grain, for example, that has a superabrasive crystal and a plurality of particles which are included within the superabrasive crystal. The superabrasive crystal may be grown under high pressure and high temperature. The inclusions are inert to chemistries or catalysts which are employed for superabrasive crystal growth. The plurality of particles may be dispersed homogeneously in the crystal during growth. The inclusions of the plurality of particles may be expected to soften superabrasive crystal fracture strength. The inclusions may modify the superabrasive crystal fracture mechanism through deviation of the crack penetration path induced by loading forces.

The fracture characteristic of superabrasive crystals, such as cBN subjected to grinding, may be either straight through the superabrasive crystals with cleavage due to naturally formed faceted shape of crystal, or dull to fracture due to high toughness. An exemplary embodiment provides a novel design of a cBN abrasive whose fracture characteristic may be improved through controlling and modifying the crack penetration path so that a low grinding power is expected if the crystal is bonded in vitreous-bond wheels.

Cubic boron nitride (cBN) grains are known to be produced from hexagonal boron nitride catalyst systems, such as alkali and alkaline earth metal nitrides, under high pressure and temperatures for a time period sufficient to form the cubic structure. The reaction mass is maintained under pressure and temperature conditions that thermodynamically favor the formation of cubic boron nitride crystal. The cubic boron nitride is then recovered from the reaction mass using a combination of water, acidic solutions or caustic chemicals using recovery methods. It should be noted that other methods of producing cubic boron nitride are known, i.e., cubic boron nitride prepared via a temperature gradient method or a shock wave method, and modification of the process taught in the instant application may be used to produce the abrasive grains having unique features.

Any combination of starting ingredients, which provide both the hexagonal boron nitride and the catalyst, may be employed. An embodiment of the starting reaction mixture may contain a source of boron, a source of nitrogen, and a source of catalyst metal. The source of the boron may be elemental boron, hexagonal boron nitride, or material such as one of the boron hydrides which may decompose to elemental boron under conditions of the reaction. The source of nitrogen may be either hexagonal boron nitride, or a nitrogen-containing compound of a catalyst metal which may provide a source of nitrogen under reaction conditions. The catalyst metal may be employed as the elemental metal or a catalyst compound which may decompose to the catalyst metal or to the catalyst metal nitride under reaction conditions.

The process is not limited to the catalytic conversion of hexagonal boron nitride to cubic boron nitride involving only one catalyst material. Thus, mixtures of two or more catalyst materials may be employed. Those mixtures may include one or more catalyst metals, one or more catalyst nitrides or one or more combinations of metals and nitrides. In addition, alloys may also be employed in the practice of the invention. These alloys include alloys of more than one catalyst metal as well as alloys of a catalyst metal and a non-catalyst metal. Other raw material combinations are also possible.

The process may be carried out in any type of apparatus capable of producing the pressures and temperatures used to manufacture the superabrasive. An apparatus that may be used is described in U.S. Pat. Nos. 2,941,241 and 2,941,248. Examples of other apparatus include belt presses, cubic presses and split-sphere presses.

The apparatus includes a reaction volume in which controllable temperatures and pressures are provided and maintained for desired periods of time. The apparatus disclosed in the aforementioned patents is a high pressure device for insertion between the platens of a hydraulic press. The high pressure device contains an annular member defining a substantially cylindrical reaction area, and two conical, piston-type members or punches designed to fit into the substantially cylindrical reaction area, and two conical, piston-type members or punches designed to fit into the substantially cylindrical portion of the annular member from either side of the annular member. A reaction vessel which fits into the annular member may be compressed by the two piston members or six piston members to reach the desired pressures in the manufacturing the grains having unique features. The temperature necessary is obtained by a suitable means, such as, by induction heating, direct or indirect resistive heating or other methods.

As shown in FIG. 1, a superabrasive material 10 may comprise a superabrasive crystal 12 and a plurality of particles 14. The plurality of particles 14 may be included within the superabrasive crystal 12. The plurality of particles 14 may comprise a non-catalyst material. The superabrasive crystal 12 may be selected from a group of cubic boron nitride, diamond, and diamond composite materials. The plurality of particles 14 may be non-binder materials. The plurality of particles 14 may comprise at least one of a metal, a metal alloy, an intermetallic compound, and a ceramic. In some exemplary embodiment, the plurality of particles may comprise at least one of a carbide, a nitride, and an oxide, such as tungsten carbide, silica carbide, boron carbide, or aluminum oxide, for example.

In some exemplary embodiment, the plurality of particles 14 may comprise particle sizes ranging from about 10 nm to about 10 um, for example. The plurality of particles 14 may be separated from each other at a range from about 1 um to about 50 um, for example. The plurality of particles 14 may be homogeneously dispersed within the superabrasive crystal, for example, as shown in FIG. 1.

The term "superabrasive," as used herein, refers to materials having a Knoop hardness greater than about 4000. The superabrasive crystal 12 may be substantially faceted. The term "facet", as used herein, refers to a flat face on geometric shapes, such as 13 in FIG. 1, which is defined by edges 15, 16, 17, 18, 19, and 20. The superabrasive crystal 12 may be substantially blocky. Blocky, used herein, refers to shape and solidity as a block, appearance being similar in three dimensions.

Figure 2:
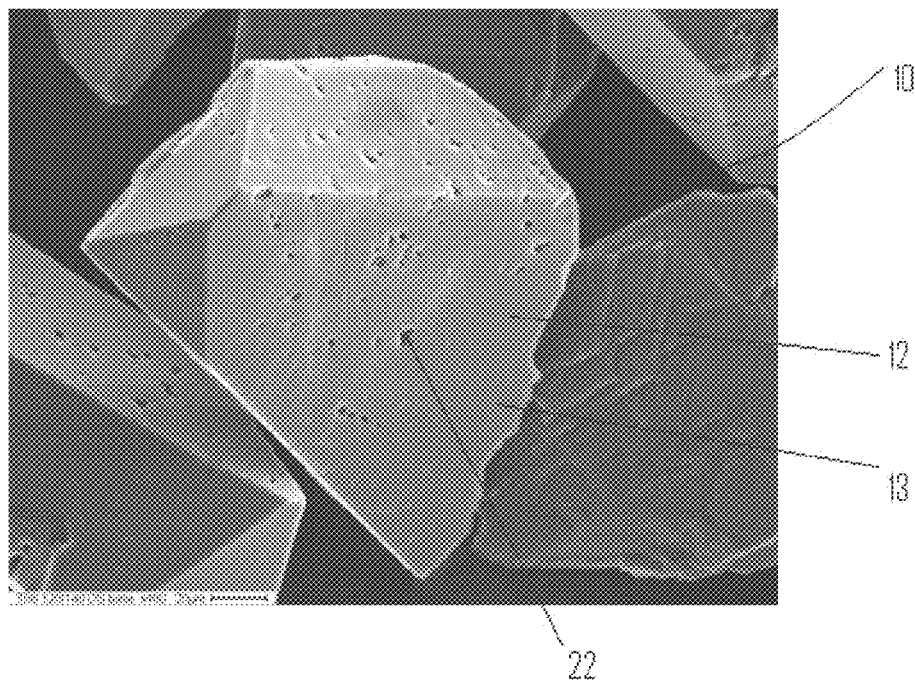
FIG. 2 is a scanning electron micrograph (SEM) image of a superabrasive material according to an exemplary embodiment.

As shown in FIG. 2. the superabrasive material 10 may comprise a single crystal structure of cBN 12 and means for modifying a crystal fracture path of the cubic boron nitride. Means for modifying a crystal fracture path of the cubic boron nitride may comprise a plurality of particles 14 (shown in FIG. 1). The plurality of particles 14 may be non-catalyst, non-binder particles, such as titanium nitride (TiN), included within the single crystal structure of cBN. The titanium nitride particles may be terminated on the facet 13 after growth of cBN and may be removed to become pits 22 after fusion cleaning, a process under which caustic chemicals, such as NaOH, or KOH, is mixed with superabrasive materials in higher temperature, such as about 300 to about 400° C. The plurality of pits 22 may have depths ranging from about 10 nm to about 30 um, for example.

Still in FIG. 2, the cBN grain may be in tetrahedral shape and most of facets are terminated with surface pits. The diameter of the pits may range from about 0.1 um to about 5 um, for example, which was similar to the sizes of the inclusion particles. These surface pits may improve cBN retention in the vit-bond, and thus improve wheel life.

Superabrasive material, such as cubic boron nitride (cBN), may be used in grinding hard ferrous alloy work pieces due to cBN's relatively non-reactivity with ferrous work pieces. Accordingly, cBN materials often are formed into grinding and machining tools. The toughness of the cBN crystals, as measured by a standard friability test, may be a factor in grinding performance. The friability test involves ball milling a quantity of product under controlled conditions and sieving the residue to measure the breakdown of the product. The toughness index (TI) is measured at room temperature. The thermal toughness index (TTI) is measured after the product has been fired at a high temperature. In many cases the tougher the crystal, the longer the life of the crystal in a grinding or machining tool and, therefore, the longer the life of the tool. This leads to less tool wear and, ultimately, lower overall tool cost.

Figure 3:
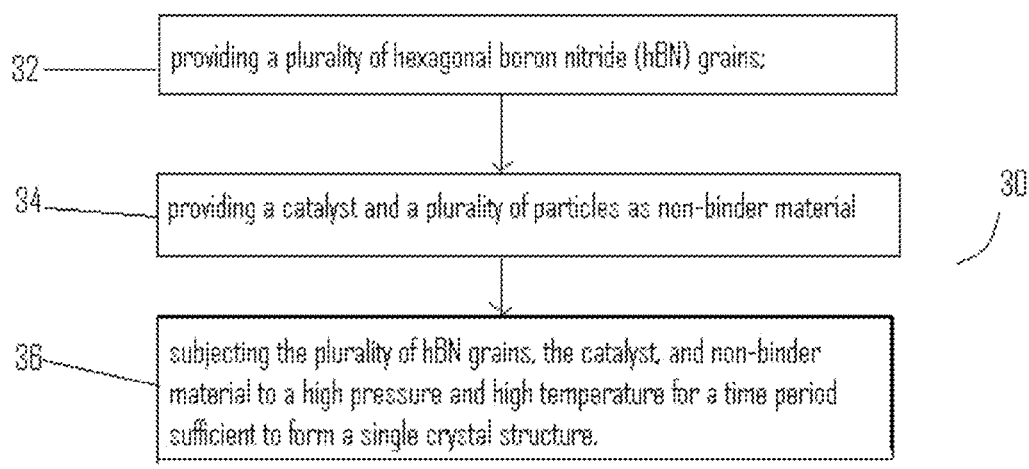
FIG. 3 is a flow diagram illustrating a method of making superabrasive materials according to an exemplary embodiment.

As shown in FIG. 3, a method 30 of making superabrasive materials according to an exemplary embodiment may include steps of providing a plurality of hexagonal boron nitride (hBN) grains in a step 32; providing a catalyst and a plurality of particles as non-binder materials in a step 34. The catalyst system chosen to grow hBN grains may include lithium compounds as catalysts, for example. An exemplary embodiment may further include subjecting the plurality of hBN grains, the catalyst, and non-binder material to a high pressure and high temperature for a time period sufficient to form a single crystal structure, such as cubic boron nitride, in a step 36. An exemplary embodiment may further include a step of cleaning products by using at least one of water, acidic solutions or caustic chemicals.

In some exemplary embodiment of the method 30, the non-binder material may comprise at least one of a carbide, a nitride, and an oxide, such as tungsten carbide, silica carbide, boron carbide, and aluminum oxide. In some embodiments, the non-binder material may comprise particles having sizes ranging from about 10 nm to about 10 um. The particles may be separated from each other at a range from about 1 um to about 50 um, for example, and dispersed homogeneously within the single crystal structure. The plurality of particles may be configured to modify a crystal fracture path of a single crystal structure and enhance cBN rention of vitreous-bond.

High pressure and high temperature may range from about 1200 to about 2000° C. and about 50 to about 90 kbar, for example, respectively.

EXAMPLE 1

Cubic boron nitride (cBN) grains were produced using a mixture that contains catalyst system primarily having alkali and alkaline earth metal nitride, and hydrides, and hexagonal boron nitride. The catalyst used included $Li_3N$, LiOH and LiH. About 2 wt % of TiN powder having a mean particle sizes of 2 μm was blended with hBN raw materials using a Turbula mixer. The total blending time was 2 hours. The mixture was then well blended with catalysts in a Nitrogen rich environment, and compacted into a cell by isostatic compaction. The cell was made to fit the reaction capsule of a high pressure high temperature apparatus.

During high temperature high pressure process (about 55 Kbar in pressure at about 1700° C.), hexagonal boron nitride was reacted with catalysts and formed alkaline boron nitride, a eutectic phase from which cubic boron nitrides grains were precipitated and grown under thermal dynamically stable condition. The entire process took about one hour.

The reaction capsule was then released from HPHT condition and returned to normal condition. The reaction mass of the mixture in the reaction capsule was removed into a tantalum barrel and thoroughly rinsed with hot water in order to refine cubic boron nitride grains from residual hexagonal boron nitride. The mixture was agitated for about 10 minutes, and then the hexagonal boron nitride suspension was decanted from the barrel. Hexagonal boron nitride powder was in white color and could be easily recognized during the recovery of cubic boron nitride grains. This process was repeated twice until most of hexagonal boron nitride was removed. The remaining mixture containing mostly cBN was heated under a heating lamp at 250 Watts for about 10 minutes to dry out. The mixture was then moved into a metal can which was filled with metal balls (1/8") at a ratio of mixture/ball=1:5. The metal can was firmly sealed by clipping the cap and setting it in a Tubular mill for ball milling at 40 RPM for about 10 minutes. This process broke some agglomerate as well as weaker cubic boron nitride grains.

After ball milling, the mixture was separated from balls by using a sieve, and then put into a nickel crucible (1000 ml size). Some sodium hydroxide powders were added to cover the cubic boron nitride grains. The nickel crucible was inserted into the center of a furnace and heated for about an hour at temperature around 400° C. After done, the crucible was taken out and cooled inside of a ventilation hood for one hour. The mixture was then rinsed using hot water and the reaction by-products were dissolved in solution and out of the crucible. Cubic boron nitride grains were then transferred to a TEFLON beaker. The grains were rinsed with a nitride acid solution in the baker for about 10 minutes. The acid solution was then washed out for about 5 minutes using DI water. Finally, the grains were rinsed with Isopropyl alcohol and heat dried for 15 minutes. After the grains were cooled down to room temperature, the grains were classified by sizes using mesh sieves. They were sorted into twelve mesh sizes: +60; 60/80; 80/100; 100/120; 120/140; 140/170; 170/200; 200/230; 230/270; 270/325; 325/400; and 400−.

Figure 4A:
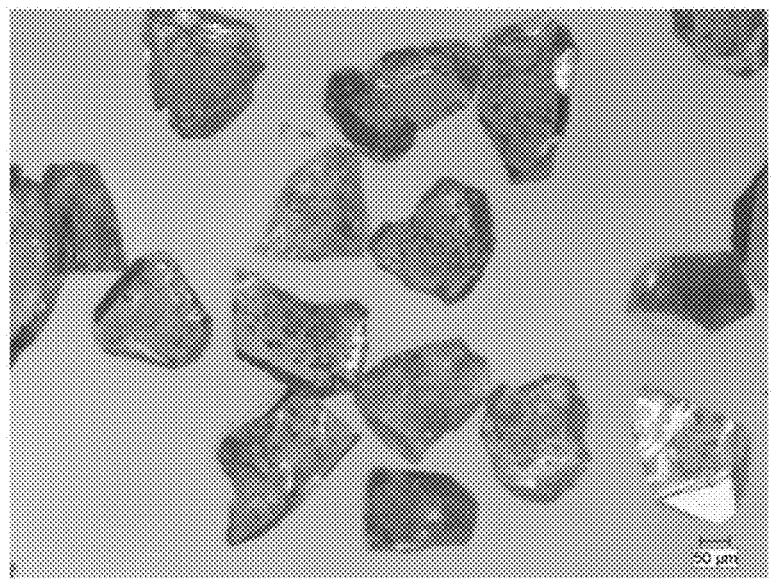
FIG. 4A is an optical image of a plurality of cBN grains in mesh size of 120/140 according to an exemplary embodiment.
Figure 4B:
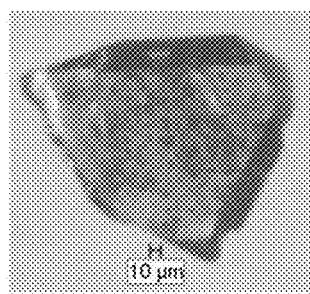
FIG. 4B is an optical image of a cBN grain illustrating inclusions dispersed inside the cBN grain homogeneously according to an exemplary embodiment.

Optical images of the unique feature of the cBN grains were shown in the FIGS. 4A and 4B. FIG. 4A represented an overview of a plurality of cBN grains in mesh size of 120/140. The crystal shape of the cBN grains was similar to those commercially available cBN products in the market. Every cBN grain had inclusions inside. The number of inclusion particles inside the CBN grains ranged from a few to several thousand. The inclusions were homogeneously dispersed inside the CBN grains, as depicted in the FIG. 4B.

EXAMPLE 2

Figure 5:
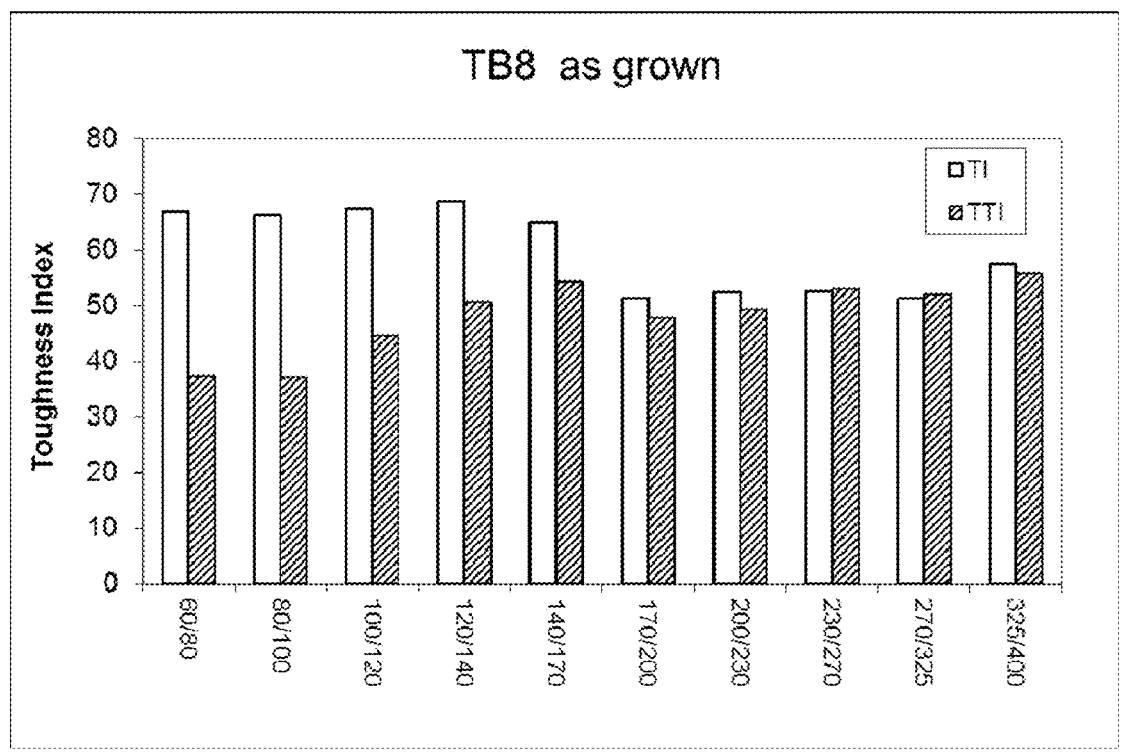
FIG. 5 is a graph illustrating a toughness index and thermal toughness index testing results on a superabrasive material at different sizes according to an exemplary embodiment.

The experimental cBN made using the example 1 method was named as TB8 and sorted through sieving. It was classified as 60+, 60/80, 80/100, 100/120, 120/140, 140/170, 170/200, 200/230, 230/270, 270/325, 325/400 and 400−. Toughness Index (TI) and Thermal Toughness Index (TTI) tests were applied to TB8 60/80 through 325/400. Thermal treatments to TB8 experimental cBN grains were performed at 1000° C. for 30 mins under Argon inert gas environment. FIG. 5 showed TI/TTI data chart in which TB8 with any sizes smaller than 170/200 possess similar TI and TTI value, while the TB8 having sizes larger than 140/170 had noticeable drops in TTI as compared to TI value. The difference between TI/TTI varied from 10 points in 140/170 up to 30 points in 60/80 mesh. This indicated that inclusions in TB8 coarse and medium sizes could soften the toughness strength after heat treatments.

EXAMPLE 3

10 grams of the TB8 cBN 120/140 was loaded into a small die having a diameter of 10 mm. The bottom piston was attached to the die prior to cBN loading. After cBN loading, the top piston was inserted into the die. The whole apparatus was transferred into a hydraulic press where pressure could be applied to the pistons and die to crush cBN crystals. In this experiment, 10 tons of the pressure was added slowly and continuously, and the pressure was held at 10 tons for about 1 minute before the pressure was released and the apparatus was taken out of the press. The top piston was removed and the CBN mesh powders were poured onto a 90 μm sieve with a pan underneath. Fine debris induced by the pressing was sieved out and those on top of the sieve were kept for SEM investigation. For comparable purpose, the same procedure was repeated for a commercial available CBN 120/140 mesh.

SEM images are shown in the FIGS. 6A-D. FIGS. 6A and 6B represented the original TB8 and commercial cBNs 120/140 prior to crushing, respectively. FIGS. 6C and 6D represented TB8 and the commercial cBN collected on the top 90 μm sieve after crushing, respectively. As seen in the FIGS. 6A and 6B, the shape and overall surface morphology of the TB8 and commercial cBN were very similar, except for surface pits exposed on the TB8. After crystal being crushed, the appearance of the TB8 cBN was very different from that of the commercial cBN, as seen in the FIGS. 4C and 4D. Visual difference between FIGS. 4C and 4D was that TB8 possessed very rough surface morphology and rough crystal edges after being crushing, while the commercial cBN still remained smooth facets after subjected to crushing. This manifested that TB8 cBN possessed micro fracture feature upon mechanical deformation that leads to micro chipping at the crystal surfaces and edges.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A superabrasive material comprising:
   a cubic boron nitride (cBN) grain having a single crystal structure; and a plurality of particles included within the cBN grain, wherein the plurality of particles comprise a non-catalyst material.

2. The superabrasive material of claim 1, wherein the plurality of particles are non-binder materials.

3. The superabrasive material of claim 1, wherein the plurality of particles comprise at least one of a metal, a metal alloy, an intermetallic compound, and a ceramic.

4. The superabrasive material of claim 1, wherein the plurality of particles comprise at least one of a carbide, a nitride, and an oxide.

5. The superabrasive material of claim 1, wherein the plurality of particles comprise at least one of tungsten carbide, silica carbide, boron carbide, and aluminum oxide.

6. The superabrasive material of claim 1, wherein the plurality of particles comprise particle sizes ranging from about 10 nm to about 10 μm.

7. The superabrasive material of claim 1, wherein the plurality of particles are separated from each other at a range from about 1 um to about 50 μm.

8. The superabrasive material of claim 1, wherein the plurality of particles are homogeneously dispersed within the superabrasive crystal.

9. The superabrasive material of claim 1, wherein the superabrasive crystal is substantially faceted.

10. The superabrasive material of claim 9 further comprises a plurality of pits on a facet of the superabrasive crystal.

11. The superabrasive material of claim 10, wherein the plurality of pits have depths ranging from about 10 nm to about 30 μm.

12. A method, comprising:
providing a plurality of hexagonal boron nitride (hBN) grains;
providing a catalyst and a plurality of particles as non-binder materials; and
subjecting the plurality of hBN grains, the catalyst, and non-binder material to a high pressure and high temperature for a time period sufficient to form a single crystal structure of a cubic boron nitride (cBN) grain, wherein the plurality of particles are dispersed within the single crystal structure of the cBN grains.

13. The method of claim 12, further comprising cleaning products by using at least one of water, acidic solutions and caustic chemicals.

14. The method of claim 12, wherein the non-binder material comprises at least one of a metal, a metal alloy, an intermetallic compound, and a ceramic compound.

15. The method of claim 12, wherein the non-binder material comprises at least one of a carbide, a nitride, and an oxide.

16. The method of claim 12, wherein the non-binder material comprises at least one of tungsten carbide, silica carbide, boron carbide, and aluminum oxide.

17. The method of claim 12, wherein the non-binder material comprises particles having sizes ranging from about 10 nm to about 10 μm.

18. The method of claim 17, wherein the particles are separated from each other at a range from about 1 um to about 50 μm.

19. The method of claim 17, wherein the particles are homogeneously dispersed within the single crystal structure.

20. The method of claim 12, wherein the high temperature and high pressure range from about 1200 to about 2000° C. and about 50 to about 90 kbar, respective.

21. The method of claim 17, wherein the plurality of particles are configured to modify a crystal fracture path of a single crystal structure.

* * * * *